United States Patent
Zhou et al.

(10) Patent No.: US 9,677,695 B2
(45) Date of Patent: Jun. 13, 2017

(54) TELESCOPIC HOSE

(71) Applicant: HANGZHOU ZHENGLONG HOSE FACTORY, Zhejiang Province (CN)

(72) Inventors: Feilong Zhou, Zhejiang Province (CN); Xiaowei Zhou, Zhejiang Province (CN)

(73) Assignee: Hangzhou Zhenglong Hose Factory, Hangzhou, Zhejiang Province (CN)

( * ) Notice: Subject to any disclaimer, the term of this patent is extended or adjusted under 35 U.S.C. 154(b) by 193 days.

(21) Appl. No.: 14/761,552

(22) PCT Filed: Apr. 24, 2015

(86) PCT No.: PCT/CN2015/077412
§ 371 (c)(1),
(2) Date: Jul. 16, 2015

(87) PCT Pub. No.: WO2015/165367
PCT Pub. Date: Nov. 5, 2015

(65) Prior Publication Data
US 2016/0305580 A1    Oct. 20, 2016

(30) Foreign Application Priority Data

Apr. 30, 2014  (CN) .......................... 2014 1 0185294

(51) Int. Cl.
*F16L 11/11* (2006.01)
*F16L 11/12* (2006.01)

(52) U.S. Cl.
CPC ............... *F16L 11/11* (2013.01); *F16L 11/12* (2013.01)

(58) Field of Classification Search
USPC .......................................... 138/119, 121, 122
See application file for complete search history.

(56) References Cited

U.S. PATENT DOCUMENTS

| | | | | |
|---|---|---|---|---|
| 2,819,488 A | * | 1/1958 | Gimbel | A22C 13/0013 138/118.1 |
| 3,029,819 A | * | 4/1962 | Starks | A61F 2/06 138/122 |
| 3,090,403 A | * | 5/1963 | Kroekel | F16J 3/047 138/121 |

(Continued)

FOREIGN PATENT DOCUMENTS

| CN | 2250465 Y | 3/1997 |
|---|---|---|
| CN | 2369052 Y | 3/2000 |

(Continued)

*Primary Examiner* — James Hook
(74) *Attorney, Agent, or Firm* — Muncy, Geissler, Olds & Lowe, P.C.

(57) ABSTRACT

The present invention relates to a hose for collecting rain water or draining water, and a telescopic hose is described. The pipe wall of the telescopic hose is formed by a plurality of wrinkling parts coiled in a stretching direction of the telescopic hose. The telescopic hose has the advantages as follows: the problem that the hose is difficult to be kept in a folded or extended state is solved; the telescopic hose not only can be extended or contracted relatively conveniently, but also can keep the shape in either folded or extended state, so that the underground wiring design can be facilitated. Meanwhile, the telescopic hose is not influenced by the aging of a material, and has a relatively good application value.

11 Claims, 2 Drawing Sheets

(56) References Cited

U.S. PATENT DOCUMENTS

| | | | | | |
|---|---|---|---|---|---|
| 3,682,371 | A | * | 8/1972 | Saika | B65D 75/40 138/119 |
| 4,802,511 | A | * | 2/1989 | Hensley | A22C 13/02 138/118.1 |
| 5,311,912 | A | * | 5/1994 | Hayward | F16D 3/845 138/121 |
| 6,398,266 | B1 | * | 6/2002 | Crump | F16L 11/15 138/121 |
| 8,291,941 | B1 | * | 10/2012 | Berardi | F16L 11/20 138/109 |
| 8,757,213 | B2 | * | 6/2014 | Berardi | F16L 11/00 138/109 |

FOREIGN PATENT DOCUMENTS

| | | |
|---|---|---|
| CN | 203823263 U | 9/2014 |
| DE | 202006014961 U1 | 2/2008 |
| JP | 6-74375 A | 3/1994 |

* cited by examiner

TELESCOPIC HOSE

FIELD OF THE INVENTION

The present invention relates to a hose for collecting rain water or draining water, belongs to the field of environmental protection, and particularly relates to a telescopic hose capable of keeping the current shape in an extending or folded state.

BACKGROUND OF THE INVENTION

Some drain pipes or water drawing pipes are needed in the process of landscaping and soil improvement. To prevent the erosion of moisture or other chemical elements in soil and reduce the manufacturing cost at the same time, plastic pipes are generally used as the drain pipes or the water drawing pipes.

In the prior art, annular corrugated plastic pipes are used as the drain pipes. The pipe wall of each of these annular corrugated pipes, formed by a plurality of annular rings at intervals, has certain extension and contraction capabilities and can be pressed and contracted. However, the contraction capability of these annular corrugated pipes is very limited, and the contraction of each annular corrugated pipe completely depends on self bending of the pipe wall of the plastic pipe. The bending amplitude of the pipe wall is relatively large during the contraction and extension process, so that brittle fracture is easily caused. Meanwhile, when plastic is aged, the extension capability of the plastic pipe is greatly weakened along with the bending capability of the pipe wall of the plastic pipe, and the plastic pipe always may not be well extended or contracted. Generally speaking, it greatly hinders the use of the plastic pipe as the plastic pipe may not be extended or folded to a predetermined position but only remains in an intermediate state of partial extension and partial folding. In addition, the extension and contraction performance of the existing telescopic corrugated pipes is poor and is greatly influenced by materials. Particularly, common telescopic hoses are made of plastic, and the plastic itself has considerable elasticity, so folded hoses restore to the extension state under the action of the elasticity of the plastic. The corrugated pipes may not be folded orderly, and the folded state may not be well kept.

Therefore, it is necessary to develop a telescopic hose capable of reducing the bending amplitude of the pipe wall as much as possible and keeping the shape in the extending or folded state at the same time.

BRIEF SUMMARY OF THE INVENTION

Aiming at the defect that the pipe wall of a telescopic hose is easily influenced by the factors such as ageing so that the extension and contraction capabilities of the hose decline in the prior art, this invention provides a novel telescopic hose of which the extension and contraction capabilities are still kept under the condition that the material is aged and damaged.

To achieve the above purposes, the invention may adopt the following technical schemes.

A pipe wall of the telescopic hose is formed by a plurality of wrinkling parts coiled in a stretching direction of the telescopic hose. Each wrinkling part includes a first wrinkling wall and a second wrinkling wall, and the first wrinkling wall and the second wrinkling wall extend along a coiling direction of the wrinkling part. Each wrinkling part protrudes towards an outer side of the telescopic hose, and the first wrinkling wall and the second wrinkling wall are respectively positioned on two sides of a protruding direction of the wrinkling part. Along the coiling direction of the wrinkling part, one side of the first wrinkling wall is connected with the second wrinkling wall, and the other side of the first wrinkling wall is connected with the second wrinkling wall of an adjacent wrinkling part. A section of the first wrinkling wall along an extending direction of the wrinkling part includes a bottom concave section, a first connecting section, a second connecting section and a top concave section. The bottom concave section, the first connecting section, the second connecting section, and the top concave section are connected end to end from the side of the first wrinkling wall close to the adjacent wrinkling part to the side of the first wrinkling wall close to the second wrinkling wall. Bottoms of both the top concave section and the bottom concave section protrude opposite to the protruding direction of the wrinkling part. The first wrinkling wall further includes a raised section between the top concave section and the second connecting section, and two ends of the raised section are respectively connected with the top concave section and the second connecting section. The first connecting section protrudes towards an outer side of the wrinkling part. The second connecting section is sunken towards an inner side of the wrinkling part. A section of the second wrinkling wall along the extending direction of the wrinkling part includes a third connecting section. The third connecting section is sunken towards the inner side of the wrinkling part.

In an embodiment of the present invention, the pipe wall of the telescopic hose may include at least two columns of through holes, and each column of through holes is arranged along the stretching direction of the telescopic hose.

In the embodiment of the present invention, when the telescopic hose is in a folded state, the through holes may be uniformly arranged around the telescopic hose at intervals, and the through holes may be arranged linearly in the stretching direction of the telescopic hose.

In one embodiment of the invention, the through holes may be positioned at joints of the first wrinkling walls and the second wrinkling walls.

In one embodiment of the invention, the section of the first wrinkling wall along the extending direction of the wrinkling part further may include a superposed section. One end of the superposed section may be connected with the second connecting section, and the other end of the superposed section may be connected with the raised section.

In one embodiment of the invention, the superposed section may include a first superposed section and a second superposed section. The first superposed section may be an extension of the second connecting section, and the second superposed section may be an extension of the raised section. The second superposed section may be positioned on the outer side of the wrinkling part relative to the first superposed section.

In one embodiment of the invention, the first superposed section may extend from the second connecting section to the third connecting section along an inner surface of the wrinkling part.

In one embodiment of the invention, the section of the second wrinkling wall along the extending direction of the wrinkling part may further include a fourth connecting section. The fourth connecting section may be positioned at one end of the third connecting section far from a joint of the first wrinkling wall and the second wrinkling wall. One end of the fourth connecting section may be connected with the third connecting section. The fourth connecting section may protrude towards the outer side of the wrinkling part.

In one embodiment of the invention, the second connecting section may be as long as or at least slightly longer than the first connecting section.

In one embodiment of the invention, the bottom of the top concave section may face one side of the protruding direction of the wrinkling part.

The present invention has the following significant technical effects:

The hose can be extended or folded conveniently, and can be stably kept in an extending or folded state. In the extended state, the hose presents an appearance similar to helixes; while in the folded state, the hose is folded into a straight pipe, and the length of the hose is greatly shortened, so that the storage space required during transportation is reduced and the transportation cost is reduced. Moreover, the hose is generally applied to soil improvement or courtyard greening and the like. The overall extension and contraction rate of the hose is less influenced by the material, so the service life is long, the using cost is reduced, and environmental friendliness is facilitated. The hose is universally popularized and used in the fields of landscaping and soil improvement at home and abroad, and the social response is good. Further, both the top concave section and the bottom concave section of the first wrinkling part have a bent structure similar to the shape of S, so that the bending amplitude of the pipe wall is reduced, breakage caused by excessive bending of the pipe wall may be effectively prevented. Particularly when the material is aged, the situation of pipe wall breakage caused by the increase of material brittleness due to ageing may be reduced, and the service life of the hose may be prolonged.

Further, the pipe wall is also provided with at least two columns of through holes, and each column of through holes is arranged linearly along the length direction of the hose in the folded state of the hose, so that early processing is facilitated. When the hose is in the extended state, each column of through holes presents a helical shape along with the rotation of the wrinkling part, so that water flow in each direction in the hose or the water in the soil may flow into and flow out from the hose in use, and accumulation of the water inside and outside the hose is effectively reduced. Gauze surrounding the pipe wall may prevent soil blocks or other impurities from entering the hose and prevent the hose from being blocked.

DETAILED DESCRIPTION OF THE EMBODIMENTS

The present invention will be further described in detail below in combination with an embodiment.

Figure 1:
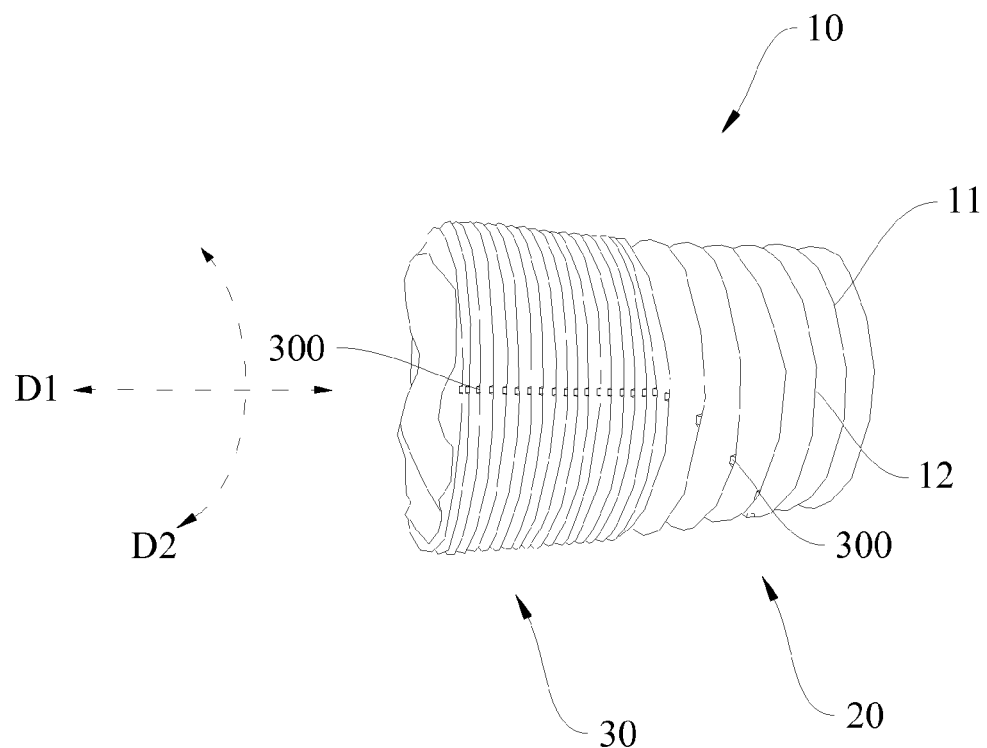
FIG. 1 is a structural schematic diagram showing a telescopic hose according to one embodiment of the present invention.

A telescopic hose is shown in FIG. 1. A pipe wall of the telescopic hose 10 is formed by a plurality of wrinkling parts 11 coiled in a stretching direction D1 of the telescopic hose 10. Drawn in FIG. 1 are a folded section 20 and a stretching section 30 of the telescopic hose 10. Coiling indicates that the wrinkling parts 11 extend clockwise or anticlockwise (namely coiling direction D2) around a center line which is the stretching direction D1. An extending direction of the wrinkling parts 11 around the center line is a coiling direction, and the coiling direction is also the processing direction of the telescopic hose 10. Finally, the pipe wall of the telescopic hose 10 forms a helical structure similar to a spring or a bolt.

Figure 2:
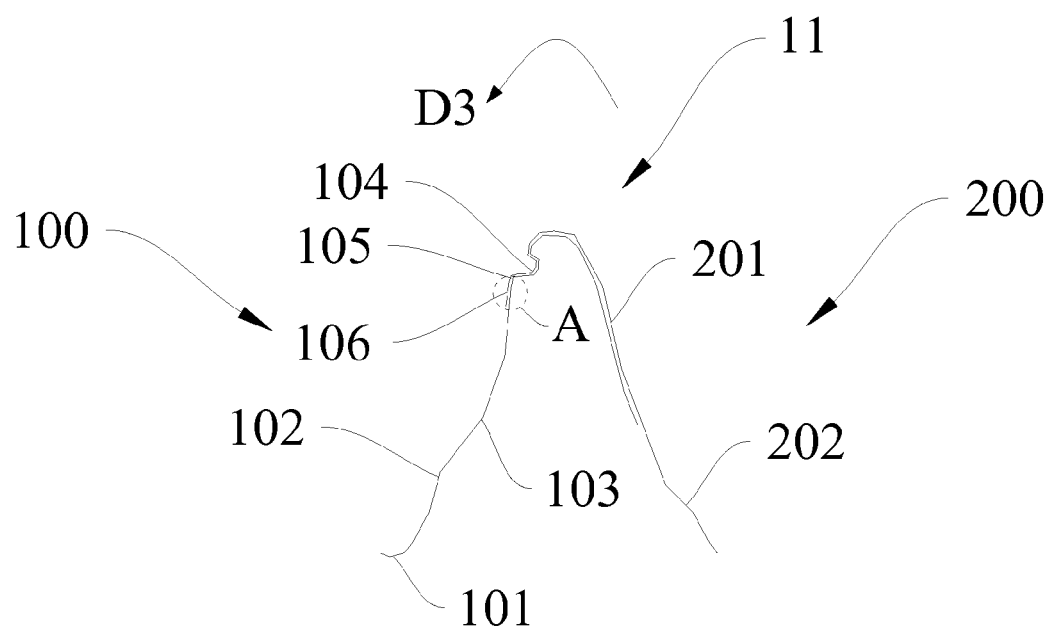
FIG. 2 is a structural schematic diagram showing a section of the telescopic hose along an extending direction of a wrinkling part according to one embodiment of the invention.
Figure 3:
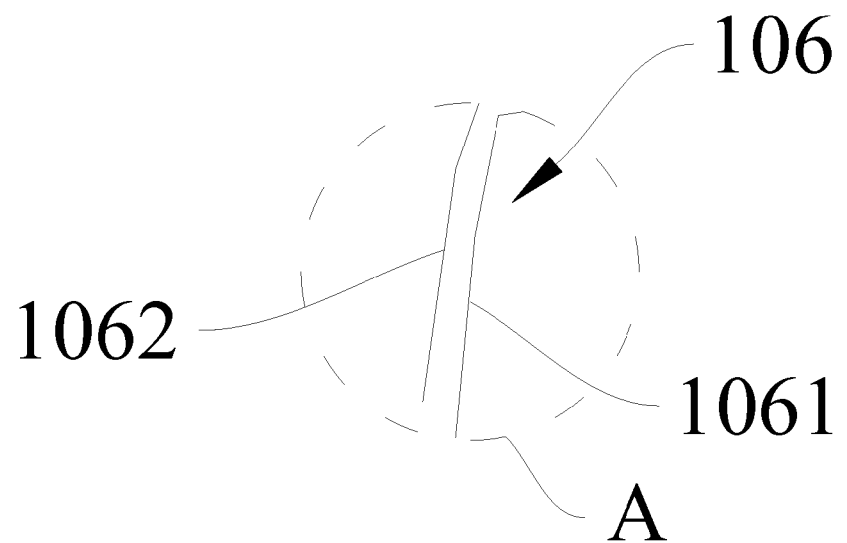
FIG. 3 is an enlarged schematic diagram of A in FIG. 2.

Each wrinkling part 11 includes a first wrinkling wall 100 and a second wrinkling wall 200, as shown in FIG. 2 and FIG. 3. For brief description in FIG. 2, FIG. 3, and FIG. 4, the thickness of the pipe wall is concealed, and only lines are reserved. Both the first wrinkling wall 100 and the second wrinkling wall 200 extend along the coiling direction of the wrinkling part 11. The wrinkling part 11 protrudes far from an outer side of the telescopic hose 10. That is, the fracture surface of the wrinkling part 11 is in a crest shape when being seen from a section of the wrinkling part 11 in an extending direction D3. The peak of the crest is the protruding direction of the wrinkling part 11, and the first wrinkling wall 100 and the second wrinkling wall 200 are respectively positioned on two sides of the protruding direction of the wrinkling part 11. Along the coiling direction of the wrinkling part 11, one side of the first wrinkling wall 100 is connected with the second wrinkling wall 200, and the other side of the first wrinkling wall 100 is connected with the second wrinkling wall of an adjacent wrinkling part 12.

The section of the first wrinkling wall 100 along the extending direction D3 of the wrinkling part 11 includes a bottom concave section 101, a first connecting section 102, a second connecting section 103, and a top concave section 104. The bottom concave section 101, the first connecting section 102, the second connecting section 103, and the top concave section 104 are connected end to end from one side of the first wrinkling wall 100 close to the adjacent wrinkling part 12 to the side of the first wrinkling wall 100 close to the second wrinkling wall 200.

Bottoms of both the top concave section 104 and the bottom concave section 101 protrude opposite to the protruding direction of the wrinkling part 11. The top concave section 104 and the bottom concave section 101 form two grooves along the coiling direction, wherein the top concave section 104 is positioned close to the crest peak of the wrinkling part 11, and the bottom concave section 101 is positioned at the bottom of the trough of the wrinkling part 11. In an extending or folding process of the telescopic hose, both the top concave section 104 and the bottom concave section 101 can be bent to ensure that the wrinkling parts 11 of the telescopic hose can be superposed together.

The first wrinkling wall 100 further includes a raised section 105 between the top concave section 104 and the second connecting section 103, and two ends of the raised section 105 are respectively connected with the top concave section 104 and the second connecting section 103. The raised section 105 forms a raised edge along the coiling direction, so that the first wrinkling wall 100 can be conveniently bent and approach the second wrinkling wall 200.

The first connecting section 102 protrudes towards an outer side of the wrinkling part 11. The second connecting section 103 is sunken towards an inner side of the wrinkling part 11. The first connecting section 102 and the second connecting section 103 are respectively used for keeping a folded state and an extended state of the telescopic hose. The first connecting section 102 protrudes towards the outer side to keep the shape of the hose in the extended state, and the second connecting section 103 is sunken towards the inner side to keep the shape of the hose in the folded state.

A section of the second wrinkling wall 200 along the extending direction D3 of the wrinkling part 11 includes a third connecting section 201. The third connecting section 201 is sunken towards the inner side of the wrinkling part 11, so that the current shape of the third connecting section 201 is kept unchanged in the extending and folding processes of the hose. The pipe wall of the telescopic hose 10 further includes at least two columns of through holes 300 (only one column is drawn in the figure), preferably, four columns or six columns of through holes 300; and each column of through holes 300 is arranged along the stretching direction D1 of the telescopic hose 10. Water flow or water in the soil enters the inner cavity of the hose via the through holes 300.

When the telescopic hose 10 is in the folded state, the through holes are uniformly arranged around the telescopic hose 10 at intervals. The through holes 300 are arranged linearly in the stretching direction D1 of the telescopic hose 10. When the hose is in the extended state, each wrinkling part 11 rotates for a relatively small angle along the coiling direction in the extending process, so each column of through holes 300 is helically arranged on the circumference of the pipe wall of the hose in the extended state. The through holes 300 are positioned at joints of the first wrinkling walls 100 and the second wrinkling walls 200 to facilitate processing.

The section of the first wrinkling wall 100 along the extending direction D3 of the wrinkling part 11 further includes a superposed section 106; one end of the superposed section 106 is connected with the second connecting section 103, and the other end of the superposed section 106 is connected with the raised section 105.

The superposed section 106 includes a first superposed section 1061 and a second superposed section 1062. The first superposed section is an extension of the second connecting section 103, and the second superposed section 1062 is an extension of the raised section 105. The second superposed section 1062 is positioned on the outer side of the wrinkling part 11 relative to the first superposed section 1061.

The first superposed section 1061 extends from the second connecting section 103 to the third connecting section 201 along an inner surface of the wrinkling part 11. In another embodiment, the first superposed section 1061 may also extend to a position nearby the bottom groove 101 along the third connecting section 201 all the time, to further improve the strength of the second wrinkling wall 200. Moreover, as another optional structure, the second superposed section 1062 may extend to the tail end of the first connecting section 102 connected with the bottom concave section 101 along the outer surface of the second connecting section 103.

The superposed section 106 has a structure formed by superposing two plastic or resin sheets extending along the coiling direction. The superposed section 106 may enhance the structural strength of the top concave section 104, the extending part of the first superposed section 1061 may enhance the structural strength of the third connecting section 201, and the extending part of the second superposed section 1062 may enhance the structural strength of the second wrinkling wall 200, so that the original shapes of the top concave section 104 and the third connecting section 201 may be kept in the folding and extending processes.

The section of the second wrinkling wall 200 along the extending direction D3 of the wrinkling part 11 further includes a fourth connecting section 202. The fourth connecting section 202 is positioned at one end of the third connecting section 201 far from the joint of the first wrinkling wall 100 and the second wrinkling wall 200, and one end of the fourth connecting section 202 is connected with the third connecting section 201. The fourth connecting section 202 protrudes towards the outer side of the wrinkling part 11. The fourth connecting section 202 may be slightly bent towards the inner side of the wrinkling part 11 during folding to facilitate the folding.

The second connecting section 103 is as long as or at least slightly longer than the first connecting section 102. The bottom of the top concave section 104 faces one side of the protruding direction of the wrinkling part 11.

Moreover, the telescopic hose 10 further includes gauze around the outer side of the pipe wall of the telescopic hose 10. The gauze may prevent soil or other impurities from passing and prevent the hose from being blocked.

The telescopic hose has the folded state and the extended state. When the telescopic hose 10 is contracted to the folded state, the two ends of the bottom concave section 101 are bent and contracted towards the center, and the two ends of the top concave section 104 are expanded far from the center of the top concave section 104. The raised section 105 is bent towards the inner side of the telescopic hose 10 at the same time. Thus, the part between the raised section 105 and the bottom concave section 101 rotates towards the second wrinkling wall 200 by taking the protruding vertex of the raised section 105 as the center when folded and contracted, till the first wrinkling wall 100 is attached to the second wrinkling wall 200 to form the folded state.

Figure 4:
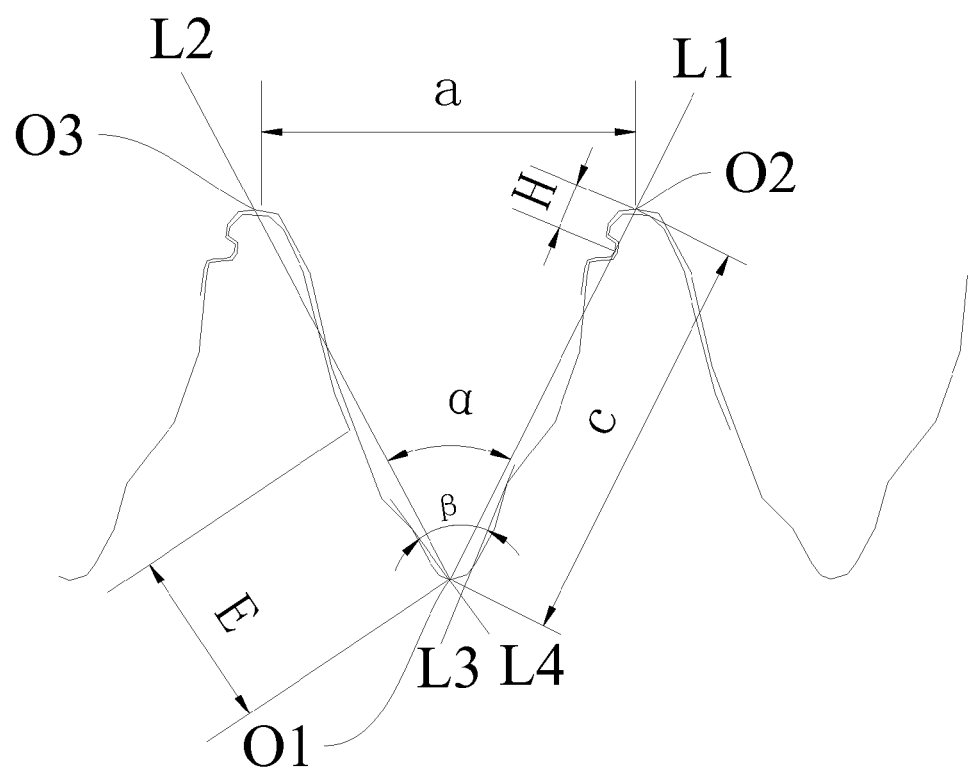
FIG. 4 is a dimension schematic diagram of the section of the telescopic hose along the extending direction of the wrinkling part according to the embodiment of the invention.

Further, the section of the first wrinkling wall 100 along the extending direction D3 of the wrinkling part 11 is a curve. As shown in FIG. 4, the linear distance from one end of the curve to the other end is c. That is, the bottom center of the bottom concave section 101 is a point O1, and the point of the joint of the first wrinkling wall 100 and the second wrinkling wall 200 on the section is a point O2, so the distance between the point O1 and the point O2 is c. The point of the joint of the first wrinkling wall and the second wrinkling wall of the adjacent wrinkling part 12 on the section is a point O3, and the linear distance between the point O2 and the point O3 is a. Further, the straight line passing through the point O1 and the point O2 is L1, the straight line passing through the point O1 and the point O3 is L2, and the included angle between L1 and L2 is $\alpha$. The straight line along the tangential direction of the first connecting section 102 connected with one end of the bottom concave section 101 is L3, the straight line along the tangential direction of the fourth connecting section 202 connected with the other end of the bottom concave section 101 is L4, and the included angle between L3 and L4 is $\beta$. The impression distance of the top concave section 104, that is the distance between the bottom center of the top concave section 104 and the point O2 is H. The impression distance of the bottom concave section 101, that is the distance between the tail end point of the extending part of the first superposed section 1061 extending along the inner surface of the second wrinkling wall 200 and the bottom midpoint of the bottom concave section 101 (or the bottom of the bottom concave section 101 at the trough of the wrinkling part 11) is E. Then the dimension of the telescopic hose 10 is:

a=10 mm-16 mm;

c=8 mm-14 mm;

α=20°–80°;

β=60°–140°;

H=0–4 mm, when H=0, the top concave section 104 is positioned right above the top of the crest of the wrinkling part 11;

E=0–5 mm, when E=0, the first superposed section 1061 extends along the inner surface of the second wrinkling wall 200 all the time to reach the bottom center of the bottom concave section 101.

The above dimension data is under the condition that the orifice diameter of the telescopic hose is 2 to 8 inches, wherein the orifice diameter may be the inside diameter or the outside diameter of the hose.

Further, the optional dimensions of the telescopic hose 10 under different orifice diameters are listed in table 1 below.

TABLE 1

| No. | Orifice Diameter (mm) | a (mm) | c (mm) | α (°) | β (°) | H (mm) | E (mm) | Note |
|---|---|---|---|---|---|---|---|---|
| 1 | 100 | 14 | 11.5 | 40 | 105 | 2 | 1 | The orifice diameter is the inside diameter or the outside diameter. |
| 2 | 51 | 12 | 10 | 40 | 105 | 2 | 1 | The orifice diameter is the inside diameter. |
| 3 | 66 | 12 | 10 | 40 | 105 | 2 | 1 | The orifice diameter is the outside diameter. |

It should be pointed out that, the dimensions recorded in the above table are preferred items, but it does not mean that the telescopic hose recorded in this embodiment can only select the data in the above table, and any other dimensions in accordance with the dimension of the hose of this embodiment is optional.

The telescopic hose obtained by the above embodiment is compared with some telescopic hoses available in the market, and the results are shown in table 2 below:

TABLE 2

| No. | Product Description | Source | Top Concave Section | Bottom Concave Section | Pipe Wall Structure | Superposed Section | Folded Part during Folding | Folded State Effect Description and Comparison | Extended state Effect Description and Comparison |
|---|---|---|---|---|---|---|---|---|---|
| 1 | The telescopic hose recorded in embodiment 1 | Embodiment 1 | Yes | Yes | Helical | Yes | Top concave section and bottom concave section | The first wrinkling wall is well attached to the second wrinkling wall after being folded, the folded state is kept well, the folded hose is unlikely to deform, and the pipe wall thickness and the pipe diameter do not influence the keeping of the folded state | Extension is good, deformation is avoided in the extended state, and the extended state can be well kept; the pipe wall has relatively good toughness in the extended state, and is upright and unlikely to deform. |
| 2 | A telescopic hose | Market | No | No | Annular | No | Crests and troughs of waves | Attachment of the hose is poor after the hose is folded, | Different parts of the pipe wall of the hose do not |

TABLE 2-continued

| No. | Product Description | Source | Top Concave Section | Bottom Concave Section | Pipe Wall Structure | Superposed Section | Folded Part during Folding | Folded State Effect Description and Comparison | Extended state Effect Description and Comparison |
|---|---|---|---|---|---|---|---|---|---|
|  |  |  |  |  |  |  |  | and the hose automatically restores to the extended state after standing for a period of time; the pipe wall of the hose is in an annular wave shape, and the waves are independent from each other, so that the contraction rate of the folded hose is not uniform, and a plurality of waves may not well keep the folded state | extend uniformly, and part of the waves may contract partially; the whole structure is not uniform. |
| 3 | A telescopic corrugated pipe | Market | No | No | Helical | No | Crests and troughs of waves | The pipe wall of the folded part is too thin, and the corrugated pipe is easily broken after being used for multiple times; the pipe wall of the folded hose is attached too tightly, so that the hose is difficult to extend again | Due to the helical waves, the extending of the corrugated pipe is limited; distortion easily happens in the extended state, and the installation is affected. |

To sum up, the hose according to the embodiment of the invention can be extended or folded conveniently, and can be stably kept in an extending or folded state. In the extended state, the hose presents an appearance similar to helixes; while in the folded state, the hose is folded into a straight pipe, and the length of the hose is greatly shortened, so that the storage space required during transportation is reduced and the transportation cost is reduced. Moreover, the hose is generally applied to soil improvement or court-yard greening and the like. The overall extension and contraction rate of the hose is less influenced by the material, so the service life is long, the using cost is reduced, and environmental friendliness is facilitated. The hose is universally popularized and used in the fields of landscaping and soil improvement at home and abroad, and the social response is good. Further, both the top concave section and the bottom concave section of the first wrinkling part have a bent structure similar to the shape of S, so that the bending amplitude of the pipe wall is reduced, breakage caused by excessive bending of the pipe wall may be effectively prevented. Particularly when the material is aged, the situation of pipe wall breakage caused by the increase of material brittleness due to ageing may be reduced, and the service life of the hose may be prolonged.

In conclusion, the above embodiment is merely a preferred embodiment of the present invention, and equivalent alterations and modifications made according to the patent scope of the present invention shall fall into the scope of the present invention.

What is claimed is:

1. A telescopic hose, wherein a pipe wall of the telescopic hose is formed by a plurality of wrinkling parts coiled in a stretching direction of the telescopic hose;
    each wrinkling part comprises a first wrinkling wall and a second wrinkling wall, the first wrinkling wall and the second wrinkling wall extend along a coiling direction of the wrinkling part; each wrinkling part protrudes towards an outer side of the telescopic hose, and the first wrinkling wall and the second wrinkling wall are respectively positioned on two sides of a protruding direction of the wrinkling part; along the coiling direction of the wrinkling part, one side of the first wrinkling wall is connected with the second wrinkling wall, and the other side of the first wrinkling wall is connected with the second wrinkling wall of an adjacent wrinkling part;
    a section of the first wrinkling wall along an extending direction of the wrinkling part comprises a bottom concave section, a first connecting section, a second connecting section, and a top concave section, the bottom concave section, the first connecting section, the second connecting section, and the top concave section are connected end to end from the side of the first wrinkling wall close to the adjacent wrinkling part to the side of the first wrinkling wall close to the second wrinkling wall;
    bottoms of both the top concave section and the bottom concave section protrude opposite to the protruding direction of the wrinkling part;
    the first wrinkling wall further comprises a raised section between the top concave section and the second connecting section, and two ends of the raised section are respectively connected with the top concave section and the second connecting section;
    the first connecting section protrudes towards an outer side of the wrinkling part;
    the second connecting section is sunken towards an inner side of the wrinkling part;
    a section of the second wrinkling wall along the extending direction of the wrinkling part comprises a third connecting section; and the third connecting section is sunken towards the inner side of the wrinkling part.

2. The telescopic hose according to claim 1, wherein the pipe wall of the telescopic hose comprises at least two columns of through holes; and each column of through holes is arranged along the stretching direction of the telescopic hose.

3. The telescopic hose according to claim 2, wherein the through holes are positioned at joints of the first wrinkling walls and the second wrinkling walls.

4. The telescopic hose according to claim 2, wherein when the telescopic hose is in a folded state, the through holes are uniformly arranged around the telescopic hose at intervals; and the through holes are arranged linearly in the stretching direction of the telescopic hose.

5. The telescopic hose according to claim 4, wherein the through holes are positioned at joints of the first wrinkling walls and the second wrinkling walls.

6. The telescopic hose according to claim 1, wherein the section of the first wrinkling wall along the extending direction of the wrinkling part further comprises a superposed section; one end of the superposed section is connected with the second connecting section, and the other end of the superposed section is connected with the raised section.

7. The telescopic hose according to claim 6, wherein the superposed section comprises a first superposed section and a second superposed section; the first superposed section is an extension of the second connecting section, and the second superposed section is an extension of the raised section; and the second superposed section is positioned on the outer side of the wrinkling part relative to the first superposed section.

8. The telescopic hose according to claim 7, wherein the first superposed section extends from the second connecting section to the third connecting section along an inner surface of the wrinkling part.

9. The telescopic hose according to claim 1, wherein the section of the second wrinkling wall along the extending direction of the wrinkling part further comprises a fourth connecting section; the fourth connecting section is positioned at one end of the third connecting section far from a joint of the first wrinkling wall and the second wrinkling wall, and one end of the fourth connecting section is connected with the third connecting section; and the fourth connecting section protrudes towards the outer side of the wrinkling part.

10. The telescopic hose according to claim 1, wherein the second connecting section is as long as or at least slightly longer than the first connecting section.

11. The telescopic hose according to claim 1, wherein the bottom of the top concave section faces one side of the protruding direction of the wrinkling part.

* * * * *